United States Patent
Rekken et al.

(10) Patent No.: US 11,345,604 B2
(45) Date of Patent: May 31, 2022

(54) TRANSSILYLATION CATALYSIS

(71) Applicant: DOW SILICONES CORPORATION, Midland, MI (US)

(72) Inventors: Brian D. Rekken, Midland, MI (US); Michael D. Telgenhoff, Midland, MI (US)

(73) Assignee: DDP Specialty Electronic Materials US 9, Inc., Wilmington, DE (US)

( * ) Notice: Subject to any disclaimer, the term of this patent is extended or adjusted under 35 U.S.C. 154(b) by 525 days.

(21) Appl. No.: 16/340,404

(22) PCT Filed: Nov. 29, 2017

(86) PCT No.: PCT/US2017/063588
§ 371 (c)(1),
(2) Date: Apr. 9, 2019

(87) PCT Pub. No.: WO2018/125476
PCT Pub. Date: Jul. 5, 2018

(65) Prior Publication Data
US 2021/0300769 A1    Sep. 30, 2021

Related U.S. Application Data

(60) Provisional application No. 62/439,238, filed on Dec. 27, 2016.

(51) Int. Cl.
*C01B 33/107* (2006.01)
*B01J 31/02* (2006.01)
*C07F 7/10* (2006.01)

(52) U.S. Cl.
CPC ..... *C01B 33/10773* (2013.01); *B01J 31/0227* (2013.01); *C01B 33/10778* (2013.01); *C07F 7/10* (2013.01); *B01J 2531/26* (2013.01)

(58) Field of Classification Search
CPC ........ C01B 33/10773; C01B 33/10778; C01B 33/107; B01J 31/0227; B01J 2531/26; B01J 31/0225; C07F 7/10
See application file for complete search history.

(56) References Cited

U.S. PATENT DOCUMENTS

| | | | |
|---|---|---|---|
| 4,722,987 A | 2/1988 | Ikeno et al. | |
| 2014/0018467 A1 | 1/2014 | Durand et al. | |
| 2015/0051357 A1 | 2/2015 | Komati et al. | |

FOREIGN PATENT DOCUMENTS

| | | |
|---|---|---|
| JP | 2013100240 A | 5/2013 |
| WO | 2003085432 A2 | 8/2005 |

OTHER PUBLICATIONS

Duffaut (Bulletin de la Societe Chimique de France, Societe Francaise de Paris, Jan. 1, 1964) (Year: 1964).*
Duhfault, et al., "New preparations of some silylamines and silazanes", Bulletin of Société chimique de France, May 14, 1964.
English translation of Search Report corresponding Chinese Application No. 201780079467.1 dated Feb. 16, 2022.

* cited by examiner

*Primary Examiner* — Anthony J Zimmer
*Assistant Examiner* — Logan Edward Laclair
(74) *Attorney, Agent, or Firm* — S. Matthew Cairns

(57) ABSTRACT

A method for making chlorinated silazanes. The method comprises contacting: (a) a disilazane; (b) a chlorosilane; and (c) a catalyst which is a zinc salt of: (i) a sulfonic acid or (ii) a sulfonic acid imide.

9 Claims, No Drawings

TRANSSILYLATION CATALYSIS

This invention relates to a method for catalyzing transsilylation reactions.

Transsilylation reactions catalyzed by zinc chloride are known, as reported in D. E. Spielvogel & C. L. Frye, *J. Organometallic Chem.*, 1978 (161) 165-169. However, the catalysts reported herein are more effective.

The problem solved by this invention is the need for additional catalysts for transsilylation reactions.

STATEMENT OF THE INVENTION

The present invention provides a method for making chlorinated silazanes. The method comprises contacting: (a) a disilazane; (b) a chlorosilane; and (c) a catalyst which is a zinc salt of: (i) a sulfonic acid or (ii) a sulfonic acid imide.

DETAILED DESCRIPTION

Percentages are weight percentages (wt %) and temperatures are in ° C. unless specified otherwise. Operations were performed at room temperature (20-25° C.) unless specified otherwise. Hydrocarbyl groups are substituent groups derived from $C_1$-$C_{20}$ hydrocarbons by removal of a hydrogen atom. Preferably, hydrocarbyl groups are straight or branched. Alkenyl groups are hydrocarbyl groups having at least one carbon-carbon double bond. Preferably, an alkenyl group has one carbon-carbon double bond. An alkyl group is a saturated $C_1$-$C_{20}$ hydrocarbyl group that may be straight or branched.

Preferably, the disilazane is substituted only by hydrocarbyl groups, chloro groups or a combination thereof. In a preferred embodiment, the disilazane is a perhydrocarbyldisilazane. Preferably, hydrocarbyl groups are $C_1$-$C_{10}$ hydrocarbyl groups, preferably $C_1$-$C_6$, preferably $C_1$-$C_4$, preferably methyl or ethyl, preferably methyl. Preferably, a hydrocarbyl group is an alkyl group or an alkenyl group having one double bond. Particularly preferred perhydrocarbyldisilazanes include hexamethyldisilazane, 1,1,1-trichloro-3,3,3-trimethyldisilazane and 1,1,3,3-tetramethyl-1,3-divinylsilazane.

Preferably, a chlorosilane is a chloro-substituted monosilane or disilane. Preferably, a chlorosilane has at least two chloro groups, preferably at least three. Particularly preferred chlorosilanes include dichlorosilane, trichlorosilane and tetrachlorosilane.

Preferably, the chlorinated silazane product has from 4 to 6 chloro groups. Preferably, the chlorinated silazane product is hexachlorodisilazane or 1,1,3,3-tetrachlorodisilazane.

Preferably, the catalyst is a zinc salt of a sulfonic acid or imide having at least one trifluoromethyl group. Preferably, the sulfonic acid is an aromatic sulfonic acid, methanesulfonic acid, trifluoromethanesulfonic acid or $HO_3S(CF_2)_xCF_3$ wherein x is an integer from 1 to 10. Preferably the aromatic sulfonic acid is p-toluenesulfonic acid. Preferably, x is at least 2, preferably at least 3; preferably no more than 9, preferably no more than 8, preferably no more than 7, preferably no more than 6, preferably no more than 5.

Preferably, reactants (a), (b) and (c) are heated at a temperature from 20 to 150° C.; preferably at least 40° C., preferably at least 50° C.; preferably no greater than 100° C., preferably no greater than 80° C. Preferably, the heating time is from 0.5 to 8 hours, preferably 0.5 to 2 hours. The proper heating time may easily be determined based on apparatus, other parameters, etc. Preferably, the chlorinated silazane is purified by distillation. Preferably, reactants are contacted at a pressure from 75 to 150 kPa. Distillations typically are done at lower than atmospheric pressure.

Preferably, reactants (a), (b) and (c) are combined in the substantial absence of a solvent other than the reactants, i.e., the reaction mixture of (a), (b) and (c) comprises no more than 5 wt % solvent, preferably no more than 1 wt %, preferably no more than 0.5 wt %, preferably no more than 0.2 wt %. Preferably, either reactant (a) or (b) is combined with reactant (c) and then with the other of reactants (a) and (b). Preferably, the reaction mixture comprising (a), (b) and (c) is substantially free of nitrile solvents, e.g., acetonitrile; i.e., it comprises no more than 3 wt % nitrile solvents, preferably no more than 0.5 wt %, preferably no more than 0.2 wt %, preferably no more than 0.1 wt %.

The chlorinated silazane product may be used to form a silicon-heteroatom film by known techniques, including, e.g., physical vapor deposition, atomic layer deposition (ALD), or chemical vapor deposition (CVD). The physical vapor deposition method may comprise sputtering. Suitable sputtering methods include direct current (DC) magnetron sputtering, ion-beam sputtering, reactive sputtering, and ion-assisted sputtering. Typically, the deposition method comprises ALD or CVD. Preferably, the heteroatoms are selected from carbon, oxygen and nitrogen.

Suitable ALD methods include plasma enhanced atomic layer deposition methods (PEALD), spatial atomic layer deposition (SALD) and thermal atomic layer deposition (TALD) methods. When PEALD methods are employed, the plasma may be any one of the foregoing plasmas. The plasma may optionally further contain a carrier gas such as molecular nitrogen or argon gas. Plasmas are formed from plasma-forming gases, which may comprise a mixture of molecular nitrogen and molecular hydrogen.

Suitable CVD methods include simple thermal vapor deposition, plasma enhanced chemical vapor deposition (PECVD), electron cyclotron resonance (ECRCVD), atmospheric pressure chemical vapor deposition (APCVD), low pressure chemical vapor deposition (LPCVD), ultrahigh vacuum chemical vapor deposition (UHVCVD), aerosol-assisted chemical vapor deposition (AACVD), direct liquid injection chemical vapor deposition (DLICVD), microwave plasma-assisted chemical vapor deposition (MPCVD), remote plasma-enhanced chemical vapor deposition (RPECVD), atomic layer chemical vapor deposition (ALCVD), hot wire chemical vapor deposition (HWCVD), hybrid physical-chemical vapor deposition (HPCVD), rapid thermal chemical vapor deposition (RTCVD), and vapor-phase epitaxy chemical vapor deposition (VPECVD), photo-assisted chemical vapor disposition (PACVD), and flame assisted chemical vapor deposition (FACVD).

EXAMPLES

Example 1: Synthesis of 1,1,3,3-tetrachlorodisilazane 5.00 g of trichlorosilane was mixed with 0.17 g zinc trifluoromethanesulfonate and 10.75 g acetonitrile, dissolving most of the zinc trifluoromethanesulfonate. 1.49 g of hexamethyldisilazane was added over 2 minutes. The solution was then heated to reflux (38.5° C.) which slowly increased in temperature as the trichlorosilane was consumed. The heating continued for 52 minutes where it reached 51.3° C. The temperature was held for 2 minutes and then allowed to slowly cool for 6 minutes. The heat source was removed. A GC of the crude material showed a 70% yield of TCDZ.

Example 2: Purification of 1,1,3,3-tetrachlorodisilazane

The crude 1,1,3,3-tetrachlorodisilazane was distilled through a 15 cm Vigreux column to give 96% 1,1,3,3-tetrachlorodisilazane.

Example 3: Synthesis of 1,1,1,3,3,3-hexachlorodisilazane 0.25 g zinc trifluoromethanesulfonate was dissolved in 5.00 g of acetonitrile, this may take a while to completely dissolve. The mixture was then added to 11.75 g of silicon tetrachloride and heated to reflux the solution. To the refluxing solution, 5.00 g of 1,1,1-trichloro-3,3,3-trimethyldisilazane, of Preparation 1, was added over 5 minutes. The reaction was refluxed for ca. 5 hours. A GC-TCD of the crude showed the mixture to give a 47.5% yield.

Example 4: Purification of 1,1,1,3,3,3-hexachlorodisilazane

The mixture from example 3 was distilled through a 15 cm Vigreux column to collect 1.24 g of 95% hexachlorodisilazane (19.4% isolated yield).

Example 5: Synthesis of 1,1,1,3,3,3-hexachlorodisilazane

Loaded 3% zinc trifluoromethanesulfonate dissolved in acetonitrile to give 3% of total mass of reaction mixture into a pressure reactor with silicon tetrachloride. Heated the reactor to 140° C. and fed hexamethyldisilazane over 5 hours and cooled to room temperature to give a 2.8% yield of 1,1,1,3,3,3-hexachlorodisilazane in the crude mixture.

The invention claimed is:

1. A method for making chlorinated silazanes; said method comprising contacting: (a) a disilazane; (b) a chlorosilane; and (c) a catalyst which is a zinc salt of: (i) a sulfonic acid or (ii) a sulfonic acid imide.

2. The method of claim 1 in which the disilazane is substituted only by hydrocarbyl groups, chloro groups or a combination thereof.

3. The method of claim 2 in which the hydrocarbyl groups are $C_1$-$C_{10}$ hydrocarbyl groups.

4. The method of claim 3 in which the chlorosilane is a chloro-substituted monosilane.

5. The method of claim 4 in which the chlorosilane is tetrachlorosilane, trichlorosilane or dichlorosilane.

6. The method of claim 5 in which the catalyst is a zinc salt of a sulfonic acid or imide having at least one trifluoromethyl group.

7. The method of claim 6 in which (a), (b) and (c) are contacted at a temperature from 20 to 150° C.

8. The method of claim 7 in which the hydrocarbyl groups are $C_1$-$C_4$ hydrocarbyl groups.

9. The method of claim 8 in which the sulfonic acid is an aromatic sulfonic acid, methanesulfonic acid, trifluoromethanesulfonic acid or $HO_3S(CF_2)_xCF_3$ wherein x is an integer from 1 to 10.

* * * * *